(12) United States Patent  
Marques et al.

(10) Patent No.: US 8,966,894 B2
(45) Date of Patent: Mar. 3, 2015

(54) TURBOCHARGER CARTRIDGE AND ENGINE CYLINDER HEAD ASSEMBLY

(75) Inventors: Manuel Marques, Richardmenil (FR); Jean-Jacques Laissus, Epinal (FR); Alain Lombard, Vosges (FR); Mani Palaniyappan, Zlin (CZ); Quentin Roberts, Vosges (FR)

(73) Assignee: Honeywell International Inc., Morristown, NJ (US)

( * ) Notice: Subject to any disclaimer, the term of this patent is extended or adjusted under 35 U.S.C. 154(b) by 471 days.

(21) Appl. No.: 13/425,891

(22) Filed: Mar. 21, 2012

(65) Prior Publication Data

US 2013/0247560 A1    Sep. 26, 2013

(51) Int. Cl.
*F02D 23/00* (2006.01)
*F04D 19/00* (2006.01)
*F04D 29/10* (2006.01)
*F01D 25/08* (2006.01)
(Continued)

(52) U.S. Cl.
CPC ............... *F02B 37/12* (2013.01); *F02B 37/183* (2013.01); *F02B 37/186* (2013.01); *F02F 1/243* (2013.01); *F01D 25/04* (2013.01); *F01D 25/24* (2013.01); *F01D 17/105* (2013.01); *F02C 6/12* (2013.01); *F05B 2220/307* (2013.01); *F05D 2220/40* (2013.01); *Y02T 10/144* (2013.01)
USPC ............. 60/602; 417/407; 417/409; 415/200; 415/177

(58) Field of Classification Search
CPC ...... F02B 37/12; F02B 37/183; F02B 37/186; F01D 25/04; F01D 25/24; F01D 17/105; F01D 25/28; F02C 6/12; F04D 27/0125; F05B 2220/307; Y02T 10/144; F02F 1/243; F05D 2220/40

USPC ................. 60/602; 417/407, 409; 415/182.1, 415/212.1, 144–145, 200, 177
See application file for complete search history.

(56) References Cited

U.S. PATENT DOCUMENTS 3,270,951 A * 9/1966 Reed ................................ 60/602
4,075,849 A * 2/1978 Richardson ..................... 60/602
(Continued)

FOREIGN PATENT DOCUMENTS

DE    202013103704 U1 * 10/2013    ................ F02F 1/24
EP         2143922 A1 *  1/2010    ................ F02F 1/24
(Continued)

OTHER PUBLICATIONS

U.S. Appl. No. 61/422,485, filed Dec. 13, 2010.
(Continued)

*Primary Examiner* — Thai Ba Trieu
(74) *Attorney, Agent, or Firm* — John C. James

(57) ABSTRACT

An turbocharger cartridge and engine cylinder head assembly includes a turbocharger cartridge that includes some but not all of the components of a turbocharger, while the engine cylinder head provides the components of the turbocharger that are not included in the cartridge. The cartridge includes a center housing rotating assembly having a shaft that joins a turbine wheel to a compressor wheel, the shaft passing through bearings housed in the center housing. The engine cylinder head defines a receptacle that receives the cartridge. The head also defines a diffuser and volute for the compressor, and a turbine volute. The cartridge defines a turbine nozzle and turbine contour, and further includes a wastegate unit as a part of the cartridge.

17 Claims, 10 Drawing Sheets

(51) Int. Cl.
*F04B 17/00* (2006.01)
*F02B 37/12* (2006.01)
*F02B 37/18* (2006.01)
*F02F 1/24* (2006.01)
*F01D 25/04* (2006.01)
*F01D 25/24* (2006.01)
*F01D 17/10* (2006.01)
*F02C 6/12* (2006.01)

(56) References Cited

U.S. PATENT DOCUMENTS

| | | | |
|---|---|---|---|
| 4,463,564 A * | 8/1984 | McInerney | 60/602 |
| 4,613,288 A * | 9/1986 | McInerney | 417/407 |
| 4,630,445 A * | 12/1986 | Parker | 60/602 |
| 4,655,040 A * | 4/1987 | Parker | 60/602 |
| 4,655,043 A * | 4/1987 | McInerney | 60/602 |
| 4,656,834 A * | 4/1987 | Elpern | 60/602 |
| 4,721,441 A | 1/1988 | Miyashita et al. | |
| 4,815,184 A | 3/1989 | Johnston et al. | |
| 5,857,337 A * | 1/1999 | Kawasaki | 60/602 |
| 6,193,463 B1 | 2/2001 | Adeff et al. | |
| 7,089,737 B2 | 8/2006 | Claus | |
| 7,428,813 B2 | 9/2008 | Finger et al. | |
| 7,637,106 B2 | 12/2009 | Hertweck et al. | |
| 8,062,006 B2 | 11/2011 | Hummel et al. | |
| 8,092,162 B2 | 1/2012 | Masson et al. | |
| 2005/0069427 A1 | 3/2005 | Roemuss et al. | |
| 2009/0031722 A1 | 2/2009 | An et al. | |
| 2009/0077966 A1 | 3/2009 | Lombard et al. | |
| 2009/0136368 A1 | 5/2009 | Arnold et al. | |
| 2009/0226307 A1 | 9/2009 | Masson et al. | |
| 2010/0180592 A1 | 7/2010 | Williams et al. | |
| 2010/0322106 A1 | 12/2010 | Qiang | |
| 2011/0011085 A1 | 1/2011 | Garrett et al. | |
| 2011/0103936 A1 | 5/2011 | Lombard | |
| 2011/0171017 A1 | 7/2011 | Lingenauber et al. | |
| 2011/0173972 A1 | 7/2011 | Wade et al. | |
| 2011/0200422 A1 | 8/2011 | Gutknecht | |
| 2011/0268559 A1 | 11/2011 | Lombard et al. | |
| 2012/0011845 A1 | 1/2012 | Williams et al. | |
| 2012/0047887 A1 * | 3/2012 | Petitjean et al. | 60/602 |
| 2012/0148386 A1 | 6/2012 | Lombard | |
| 2012/0192557 A1 * | 8/2012 | Johnson et al. | 60/599 |
| 2012/0321455 A1 * | 12/2012 | Boening et al. | 415/208.1 |
| 2013/0071243 A1 | 3/2013 | Kocher et al. | |
| 2013/0149126 A1 * | 6/2013 | Herrera Celaya et al. | 415/200 |
| 2013/0195620 A1 * | 8/2013 | Joergl et al. | 415/116 |
| 2013/0202431 A1 * | 8/2013 | Heidingsfelder et al. | 415/220 |
| 2013/0223995 A1 | 8/2013 | Lombard et al. | |
| 2013/0247566 A1 * | 9/2013 | Lombard et al. | 60/605.1 |

FOREIGN PATENT DOCUMENTS

| | | | | |
|---|---|---|---|---|
| GB | 2478008 A * | 8/2011 | | F02F 1/24 |
| GB | 2494145 A * | 3/2013 | | F02F 1/24 |
| JP | 57-052624 A | 3/1982 | | |
| JP | 2002-303145 A | 10/2002 | | |
| JP | 2006-194227 A | 7/2006 | | |
| JP | 2006249945 A * | 9/2006 | | F02F 1/24 |
| JP | 2006-266244 A | 10/2006 | | |
| JP | 2010-038091 A | 2/2010 | | |
| JP | 2010-151283 A | 6/2010 | | |
| WO | WO 2010/085494 A1 | 7/2010 | | |
| WO | WO 2011/154874 A2 | 12/2011 | | |
| WO | WO2012076416 A1 * | 6/2012 | | F04D 25/06 |

OTHER PUBLICATIONS

International Search Report and Written Opinion for Application No. PCT/US2013/029770, dated Jun. 17, 2013.
International Search Report and Written Opinion for Application No. PCT/US2013/029319, dated Jun. 13, 2013.
International Search Report and Written Opinion for Application No. PCT/US2013/029537, dated Jun. 14, 2013.
Office Action from U.S. Appl. No. 13/425,943, dated Sep. 4, 2014.

* cited by examiner

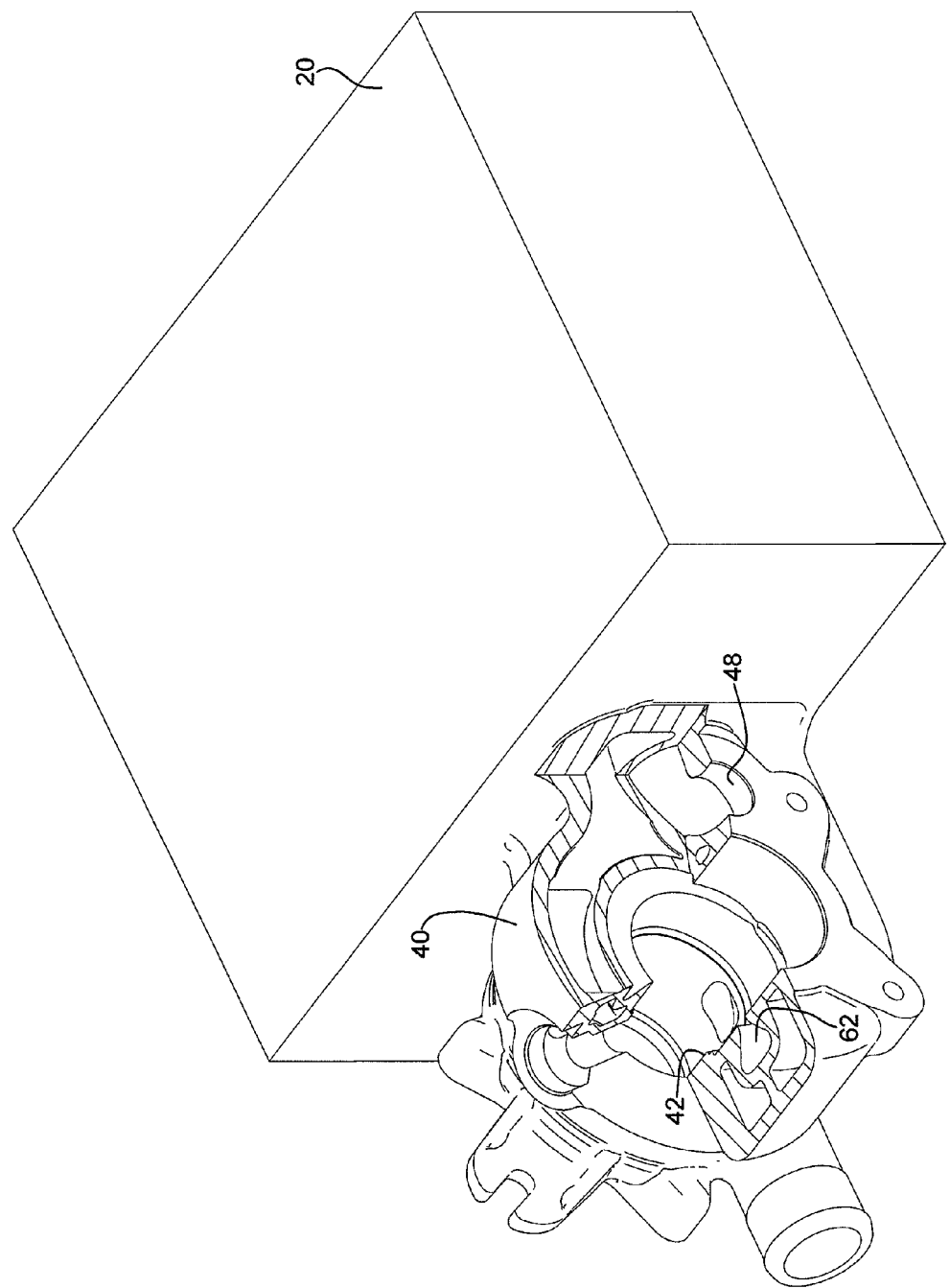

TURBOCHARGER CARTRIDGE AND ENGINE CYLINDER HEAD ASSEMBLY

BACKGROUND OF THE INVENTION

The present disclosure relates to exhaust gas-driven turbochargers, and particularly relates to turbocharger and engine cylinder head assemblies.

Increasingly, gasoline engines are being produced in the form of turbocharged engines. It would be desirable to provide a turbocharger that can be produced at lower cost without sacrificing performance. Production cost for a turbocharger for a gasoline engine is largely driven by the cost of the turbine housing.

BRIEF SUMMARY OF THE DISCLOSURE

The present disclosure addresses issues such as the one noted above.

In accordance with one embodiment described herein, a turbocharger cartridge is provided that includes: (1) a center housing rotating assembly, which comprises a center housing, bearings housed in the center housing, a shaft rotatably supported in the bearings, and compressor and turbine wheels affixed to opposite ends of the shaft; (2) a housing member that defines a turbine nozzle and a turbine contour (i.e., a wall that lies closely adjacent the radially outer tips of the blades of the turbine wheel in the vicinity and downstream of a throat of the blade passages); and (3) a wastegate unit operable for allowing exhaust gas to bypass the turbine wheel when the wastegate unit is open.

The turbocharger cartridge is configured to fit into a receptacle defined in an engine cylinder head. The engine cylinder head is configured to define components that would ordinarily be parts of the turbocharger in a conventional turbocharger design. Specifically, the engine cylinder head defines a compressor inlet and compressor contour (i.e., a wall that lies closely adjacent the radially outer tips of the compressor blades), a diffuser for receiving and diffusing pressurized air from the compressor wheel, a compressor volute that receives the air from the diffuser, and a turbine volute for receiving exhaust gas from the engine.

The turbocharger cartridge and the receptacle in the engine cylinder head are configured so that the cartridge slides, compressor wheel first, into the receptacle in an axial direction. The cartridge is then affixed to the engine cylinder head, and seals between the cartridge and the engine cylinder head are compressed to seal the interfaces therebetween.

The wastegate unit comprises a wastegate housing, and in one embodiment the wastegate housing and the housing member defining the turbine nozzle and turbine contour can be a one-piece integral part, such as a part formed by casting.

The present disclosure also describes a turbocharger cartridge for insertion into a receptacle defined in an engine cylinder head. The turbocharger cartridge comprises a center housing defining a bore therethrough, bearings housed in the bore, a shaft rotatably supported in the bearings, a compressor wheel affixed to one end of the shaft, and a turbine wheel affixed to an opposite end of the shaft. The cartridge further comprises a wastegate unit mounted to the center housing and operable for allowing exhaust gas to bypass the turbine wheel when the wastegate unit is open.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

FIG. 1A is a perspective view of the engine cylinder head, partly in section;

DETAILED DESCRIPTION OF THE DRAWINGS

The present disclosure now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
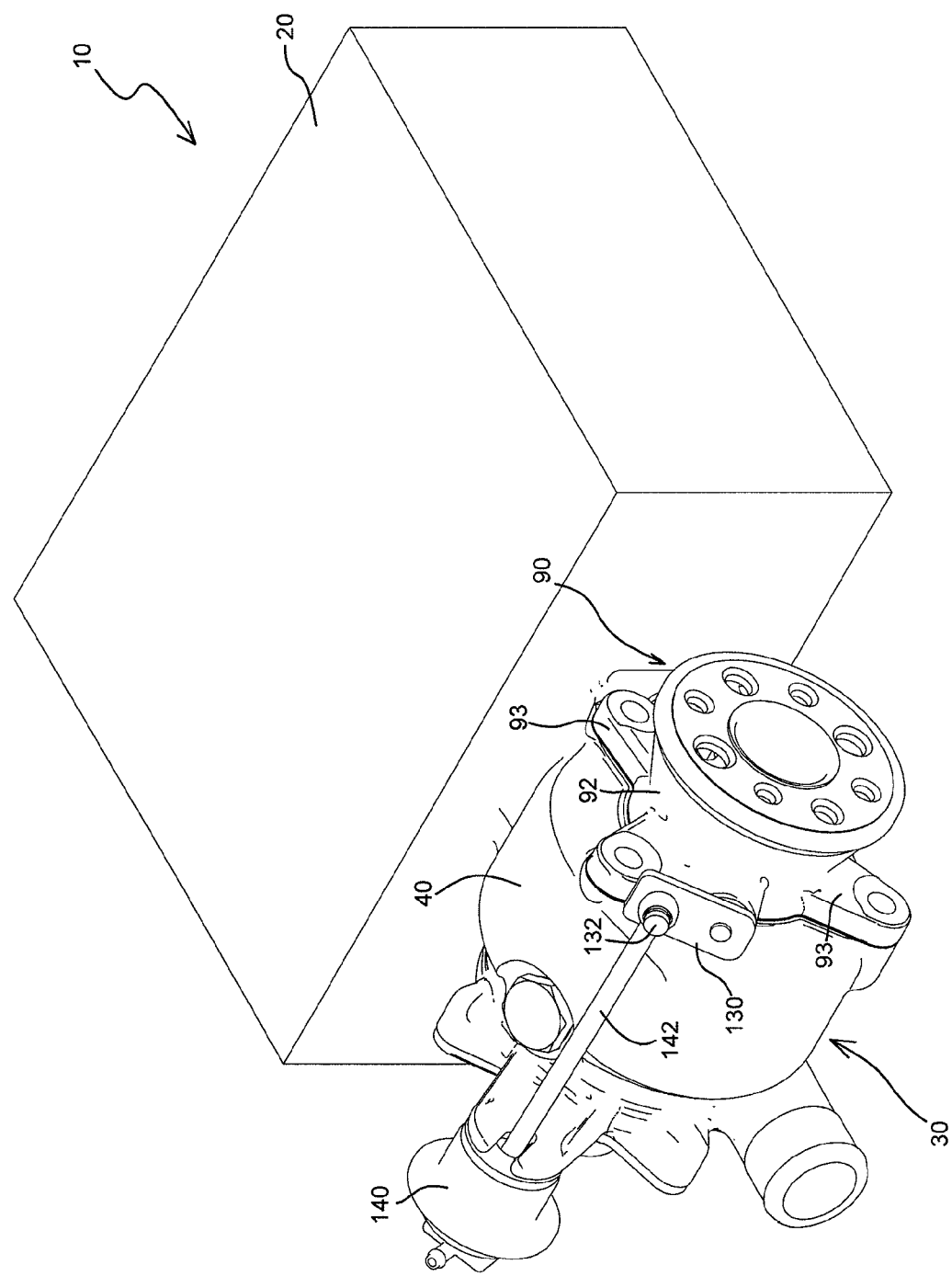
FIG. 1 is a perspective view of a turbocharger cartridge and engine cylinder head assembly in accordance with one embodiment of the present invention.
Figure 2:
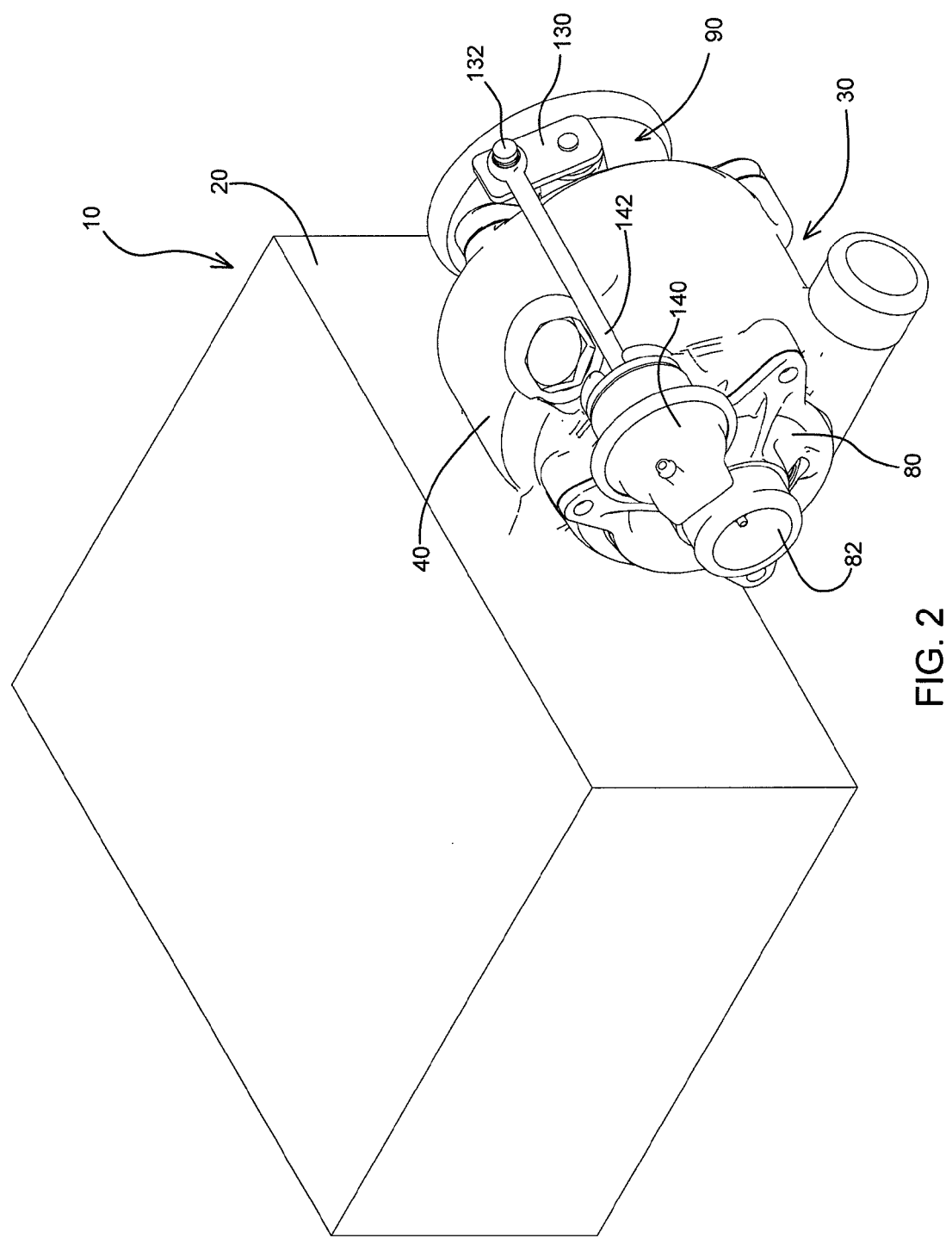
FIG. 2 is a further perspective view of the turbocharger cartridge and engine cylinder head assembly of FIG. 1.
Figure 3:
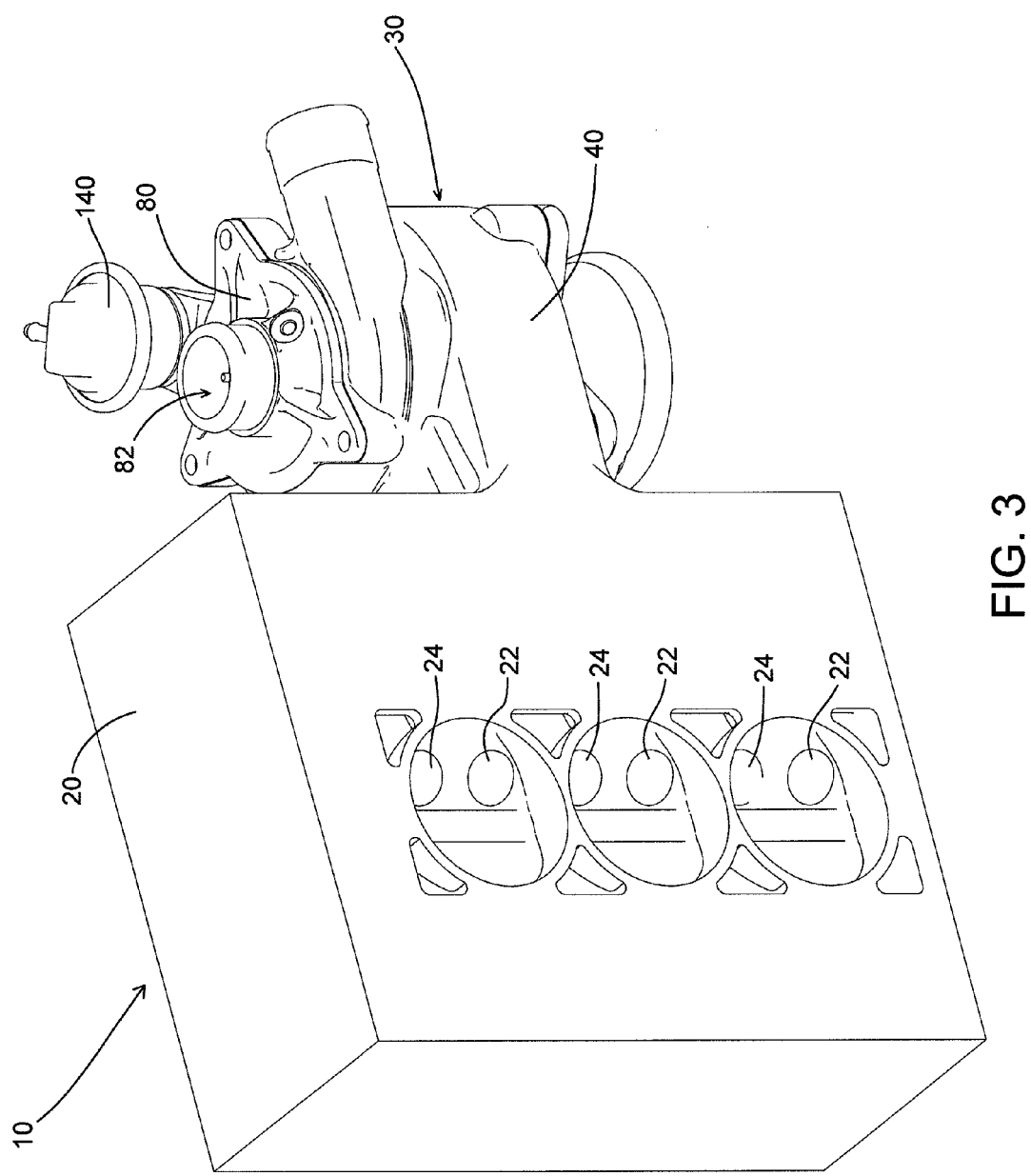
FIG. 3 is a still further perspective view of the turbocharger cartridge and engine cylinder head assembly of FIG. 1.
Figure 7:
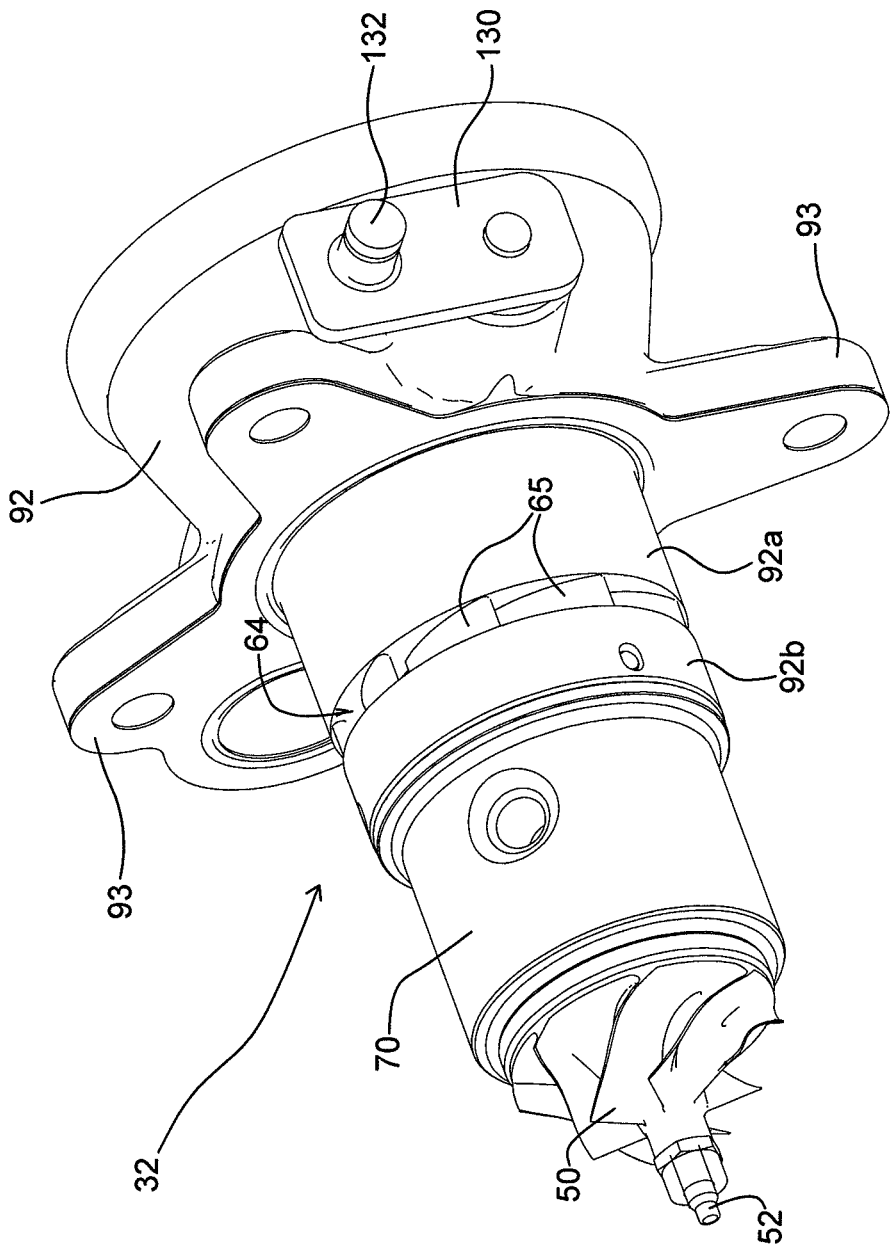
FIG. 7 is a perspective view of the turbocharger cartridge.
Figure 8:
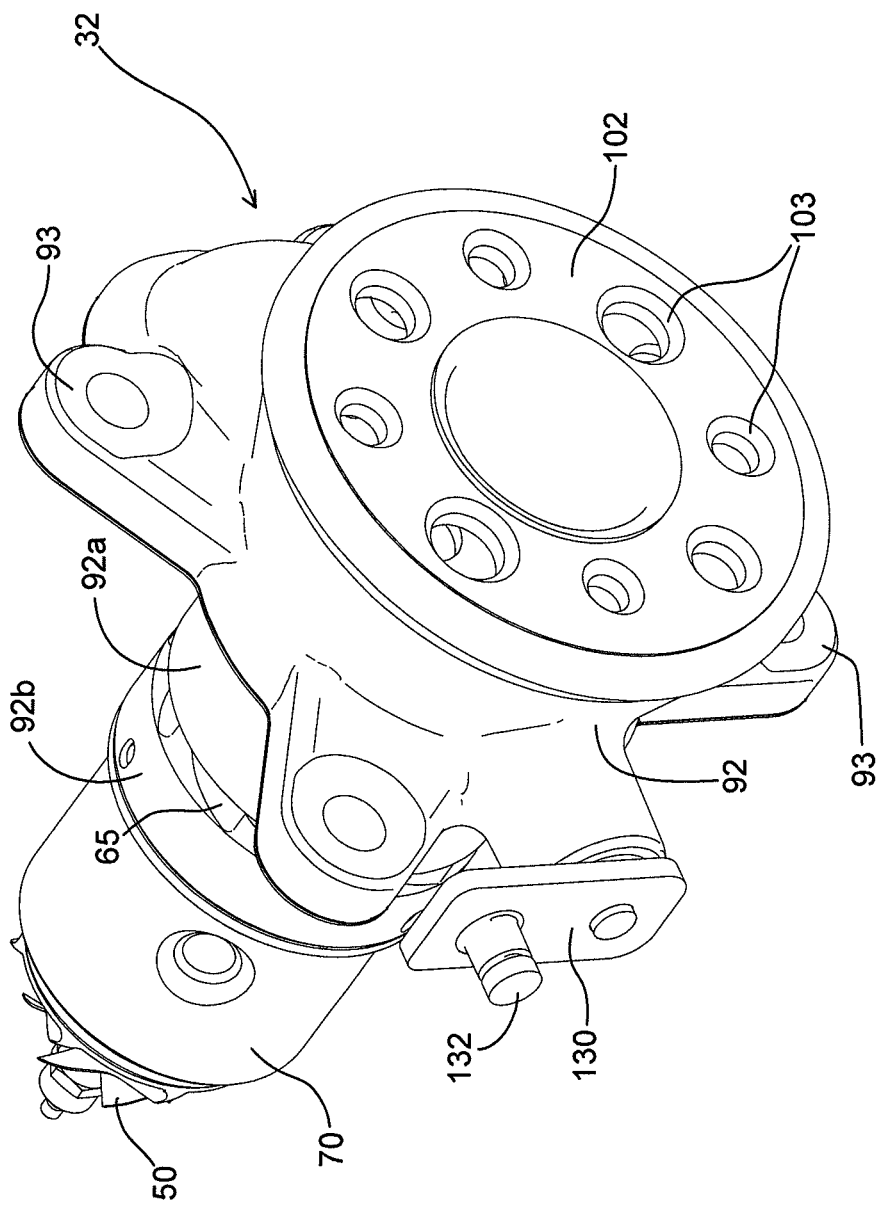
FIG. 8 is a further perspective view of the turbocharger cartridge.
Figure 9:
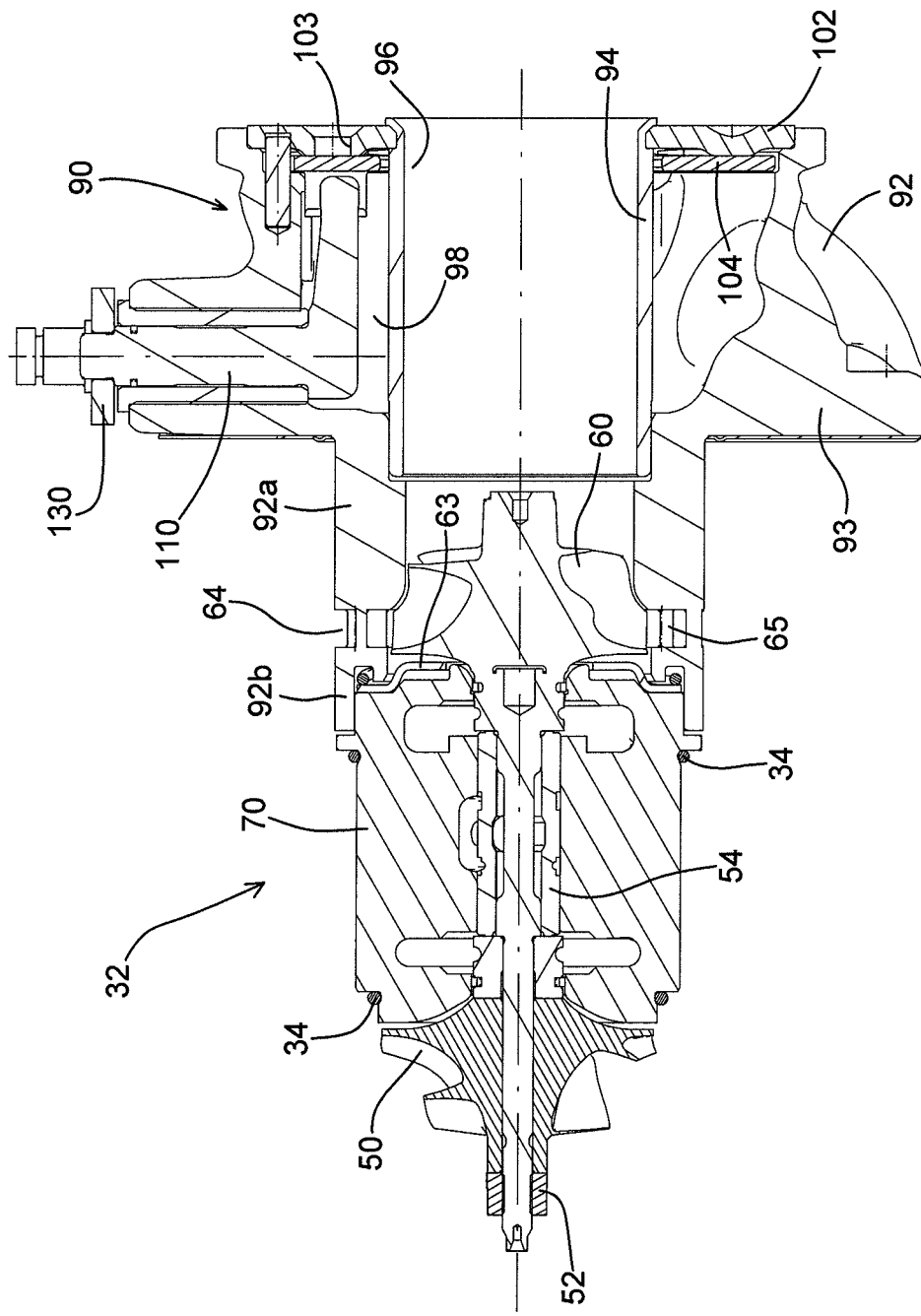
FIG. 9 is a cross-sectional view of the turbocharger cartridge.

A turbocharger cartridge and engine cylinder head assembly 10 in accordance with one embodiment of the invention is depicted in FIGS. 1-6, and a turbocharger cartridge 32 of the assembly is depicted in FIGS. 7-9. The assembly 10 comprises an engine cylinder head 20 (illustrated only schematically) on which a turbocharger 30 is mounted. The engine cylinder head 20 comprises a casting that is configured to sit atop the engine block, above the engine cylinders. The head 20 typically houses components of the intake and exhaust valves for the cylinders and defines intake and exhaust passages through which intake air is delivered to the cylinders and exhaust gases are routed away from the cylinders, respectively. With reference to FIG. 3, for example, the head 20 is illustrated as being configured for a 3-cylinder engine, although the invention is applicable to engines of any number of cylinders. For each cylinder, the head defines at least one intake passage 22 and at least one exhaust passage 24. The head is configured to route the exhaust gases produced in the engine cylinders through the exhaust passages 24 into an exhaust manifold (not shown) that feeds exhaust gases to the turbine of the turbocharger.

The cylinder head 20 defines a housing member 40 as an integral part thereof. The head proper and the housing member collectively can be, for example, a one-piece casting. As further described below, the housing member 40 is configured to define a number of features that would conventionally be defined by separate housing members of the turbocharger 30.

With reference to FIGS. 5 through 9, the turbocharger 30 includes a "cartridge" 32, also referred to herein as a center housing rotating assembly (CHRA). The CHRA 32 comprises a compressor wheel 50 affixed to one end of a shaft 52 and a turbine wheel 60 affixed to the opposite end of the shaft 52, bearings 54 that rotatably support the shaft 52, and a center housing 70 that houses the bearings 54 and defines oil passages for supplying oil to and scavenging oil from the bearings, and (optionally) water passages for circulating coolant through the center housing.

In accordance with the invention, the housing member 40 of the cylinder head 20 defines a receptacle 42 that receives the CHRA 32. The receptacle 42 is a stepped, generally cylindrical bore extending axially through the housing member 40. The receptacle is configured to allow the CHRA 32 to be slid axially into the receptacle, compressor wheel first (i.e., to the left in FIGS. 4 and 5). Thus, the receptacle 42 for example can have various portions of differing inside diameters, with steps transitioning between adjacent portions of different diameters. The steps are turbine-side-facing, i.e., each step faces axially toward the turbine side of the CHRA (to the right in FIGS. 4 and 5), and thus the receptacle becomes progressively smaller in diameter in the direction from the turbine toward the compressor. The center housing 70 of the CHRA 32 is correspondingly stepped to substantially match the stepped configuration of the receptacle 42. There are seals (e.g., O-rings) 34 between the center housing 70 and the receptacle 42 for sealing the interface therebetween and to separate or isolate the oil passages and the water passages (if present) in the center housing.

The CHRA 32 further includes a wastegate or turbine bypass unit 90. The wastegate unit is operable to allow some or substantially all of the exhaust gases to bypass the turbine wheel 60 under certain operating conditions. In the illustrated embodiment, the wastegate unit 90 is a rotary turbine bypass (RTB) unit generally as described in Applicant's co-pending U.S. application Ser. No. 12/611,816 filed on Nov. 3, 2009, application Ser. No. 12/771,434 filed on Apr. 30, 2010, application Ser. No. 12/966,343 filed Dec. 13, 2010, and Application Ser. No. 61/422,485 filed Dec. 13, 2010, the entire disclosures of said applications being hereby incorporated herein by reference.

Figure 4:
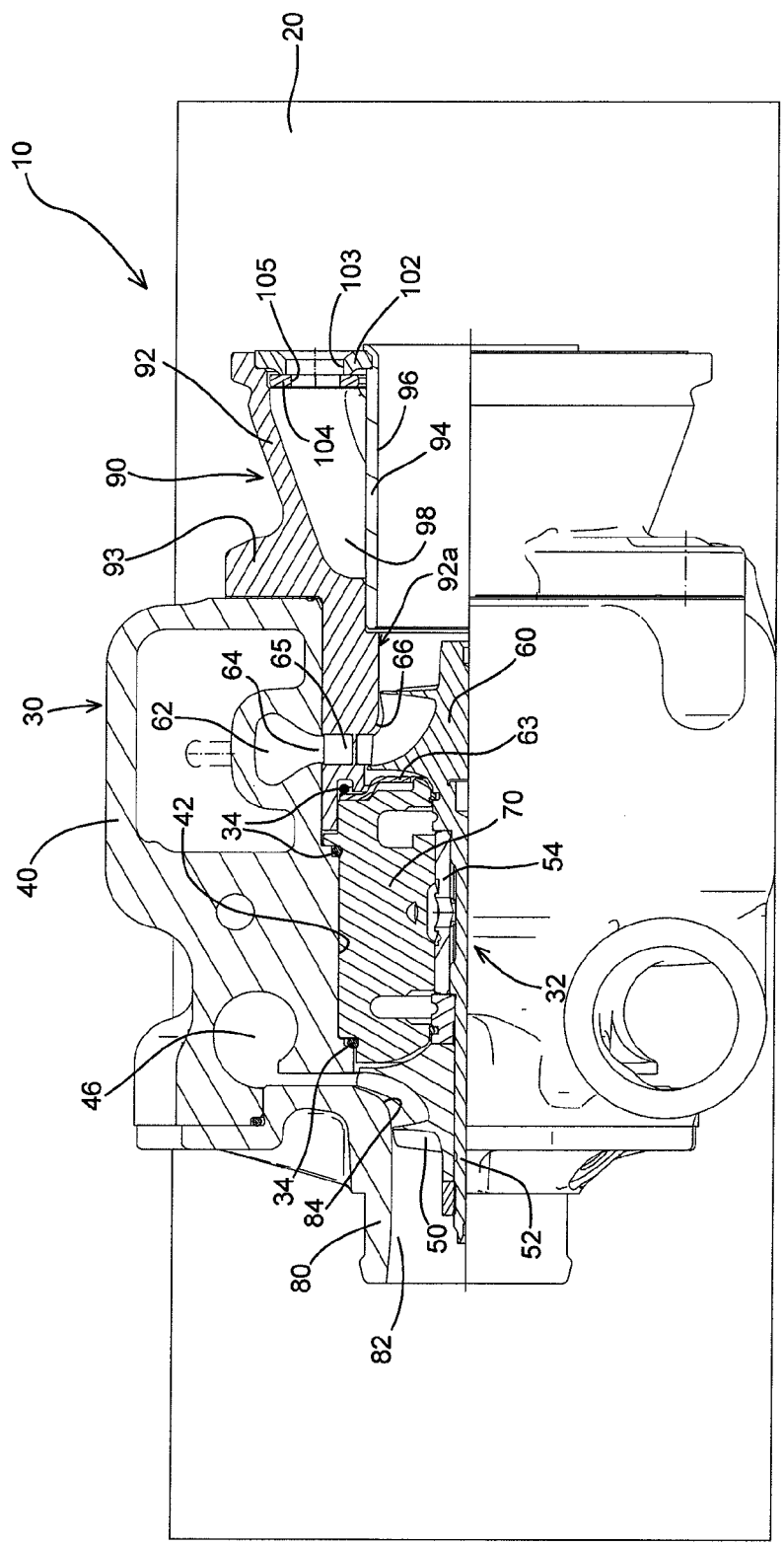
FIG. 4 is a front view of the turbocharger cartridge and engine cylinder head assembly of FIG. 1, partly in section.
Figure 5:
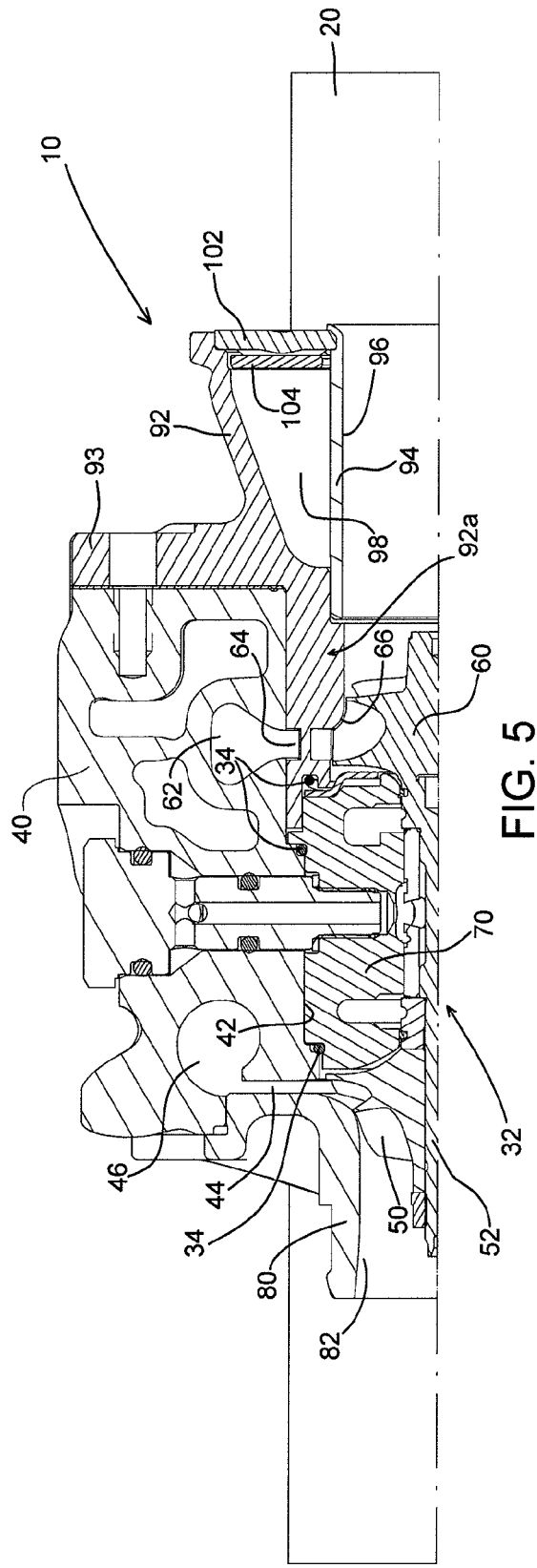
FIG. 5 is a cross-sectional view through the turbocharger cartridge and engine cylinder head assembly.
Figure 6:
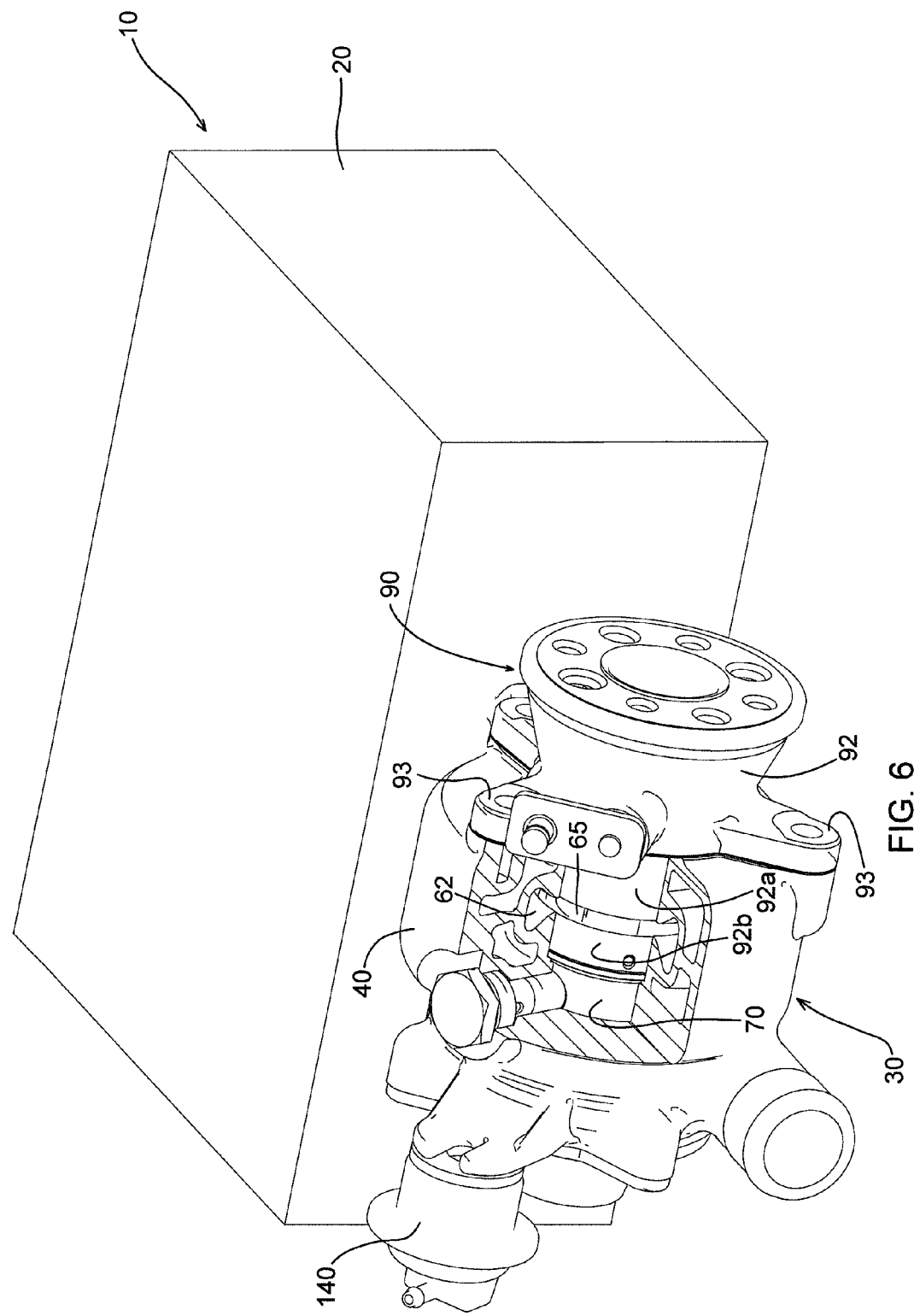
FIG. 6 is a perspective view of the turbocharger cartridge and engine cylinder head assembly, partly in section.

With reference to FIGS. 4 and 5, the RTB unit 90 includes a valve housing assembly comprising a main housing 92 (also referred to herein as a wastegate housing) and a housing insert 94. The main housing 92 defines a passage extending axially through the main housing. The housing insert 94 comprises a generally tubular member that is disposed in the passage of the main housing such that the interior of the housing insert 94 defines a central flow passage 96, and an annular space between the outer surface of the housing insert 94 and an inner surface of the main housing 92 defines an annular flow passage (also referred to herein as a wastegate passage) 98 that surrounds the central flow passage 96. The main housing 92 further defines one or more flanges 93 configured to be affixed to the housing member 40 of the engine cylinder head, such as by threaded fasteners (not shown) passing through apertures in the flange(s) 93 and into corresponding apertures (FIG. 5) in the housing member 40, in order to secure the RTB unit 90 to the housing member 40.

The RTB unit 90 further comprises a stationary valve seat 102 and a rotary valve member 104 in abutting engagement with the valve seat. The valve seat 102 and valve member 104 are arranged in the annular space between the main housing 92 and the housing insert 94. The valve member 104 is prevented from moving axially upstream by a shoulder defined by the main housing 92, although during operation pressure of the exhaust gas urges the valve member 104 in the downstream direction. The valve member 104 is not constrained by the main housing but is free to rotate about its axis and to move axially against the valve seat 102. The valve seat 102 is prevented from moving axially, radially, or rotationally. The valve seat 102 is a generally flat ring-shaped or annular member having a plurality of orifices 103 (FIG. 4) circumferentially spaced apart about a circumference of the valve seat, the orifices 103 extending generally axially between the upstream and downstream faces of the valve seat. The orifices 103 can be uniformly or non-uniformly spaced about the circumference of the valve seat.

The rotary valve member 104 is a generally flat ring-shaped or annular member having a plurality of orifices 105 (FIG. 4) circumferentially spaced apart about a circumference of the valve member, the orifices 105 extending generally axially between the upstream and downstream faces of the valve member. The orifices 105 can be uniformly or non-uniformly spaced about the circumference of the valve member. The number and spacing of the orifices 105 in the valve member can be the same as the number and spacing of the orifices 103 in the valve seat. However, non-uniform spacing of the orifices 105 is also possible and can be advantageous in some circumstances; furthermore, the spacings of the orifices 103 and 105 do not have to be the same, and in some cases it can be advantageous for the spacings to be different. The main housing 92 and the housing insert 94 both define substantially circular bearing surfaces for the outer and inner edges of the rotary valve member 104 and there are clearances therebetween, so that the valve member 104 can be rotated in one direction or the opposite direction about its central longitudinal axis in order to vary a degree of alignment between the valve member orifices 105 and the valve seat orifices 103.

The valve member 104 is engaged by the distal end of an L-shaped drive arm 110 (FIG. 9) a portion of which passes through a bushing installed in a bore defined in the main housing 92, the bore connecting with the annular flow passage 98. The proximal (radially outer) end of the drive arm is located outside the main housing 92 and is rigidly affixed to a link 130. An actuator 140 is provided for rotating the drive arm 110. The link 130 has a connecting member 132 that is offset from the rotation axis of the drive arm 110 and that is coupled to an actuator rod 142 of the actuator 140 such that extension of the actuator rod causes the link 130 to rotate the drive arm in one direction and retraction of the actuator rod causes the link to rotate the drive arm in the opposite direction. As a result, the drive arm causes the valve member 104 to be rotated in one direction or the opposite direction about its axis.

With reference to FIGS. 4 and 5, the housing member 40 of the engine cylinder head 20 defines a diffuser 44 for receiving and diffusing pressurized air from the compressor wheel 50, a compressor volute 46 that receives the air from the diffuser, and a turbine volute 62 for receiving exhaust gas from an engine. These features conventionally would be defined by compressor and turbine housings of the turbocharger. The assembly also includes a compressor contour plug 80 that defines a compressor inlet 82 and a compressor contour 84. In the illustrated embodiment, the plug 80 is formed separately from the housing member 40 and is attached to the housing member by threaded fasteners (not shown). Alternatively, however, the plug 80 could be formed integrally as part of the housing member 40.

The housing member 92 of the wastegate unit 90 includes a portion 92a that is received into the receptacle 42 of the engine cylinder housing member 40 and that defines a turbine nozzle 64 and a turbine contour 66, as best seen in FIGS. 4 and 5. The turbine nozzle comprises an aperture extending substantially 360 degrees about the housing member 92 and extending from a radially outer surface to a radially inner surface of the housing member. An array of circumferentially spaced vanes 65 extend across the turbine nozzle 64. The vanes 65 provide a flow-guiding function for guiding the exhaust gas into the turbine wheel 60 in an advantageous direction. In the illustrated embodiment, the wastegate housing 92 also includes a portion 92b that defines a bore into which an end of the center housing 70 is received. A separate heat shield 63 is captured between the end of the center housing and the portion 92b of the wastegate housing 92.

While a wastegate in the form of a rotary valve 90 is described and illustrated, the wastegate alternatively can be a non-rotary valve such as a poppet valve. The housing member of the poppet valve can include the above-noted features defining the turbine nozzle 64, vanes 65, and turbine contour 66.

With reference to FIG. 1A, the housing member 40 of the engine cylinder head 20 defines an integral wastegate passage 48 arranged to be in communication with the annular wastegate passage 98 (FIG. 4) of the wastegate unit 90. When the wastegate unit 90 is closed, exhaust gas is substantially prevented from flowing through the wastegate passage 48 and the wastegate passage 98, such that exhaust gas from the exhaust gas manifold is directed into the turbine wheel 60. When the wastegate unit 90 is partially or fully open, some or most of the exhaust gas bypasses the turbine wheel.

Thus, a significant advantage of the turbocharger cartridge and engine cylinder head assembly 10 described herein is that the CHRA 32 having the wastegate unit 90 constitutes a single component that can simply be inserted into the receptacle 42 defined by the housing member 40 of the cylinder head 20. The assembly is completed by affixing the wastegate housing 92 and the compressor contour plug 80 to the housing member 40 of the cylinder head, such as with threaded fasteners (not shown). Integration of certain features into the engine cylinder head as described above thereby allows a substantial simplification of the turbocharger components to be supplied to the engine manufacturer or assembler.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbocharger cartridge for insertion into a receptacle defined in an engine cylinder head, comprising:
a center housing defining a bore therethrough, bearings housed in the bore, a shaft rotatably supported in the bearings, a compressor wheel affixed to one end of the shaft, and a turbine wheel affixed to an opposite end of the shaft; and
a wastegate unit mounted to the center housing and operable for allowing exhaust gas to bypass the turbine wheel when the wastegate unit is open, wherein the wastegate unit includes a wastegate housing, a portion of the wastegate housing defining a bore into which an end of the center housing is received.

2. The turbocharger cartridge of claim 1, further comprising a separate heat shield captured between the center housing and the wastegate housing.

3. The turbocharger cartridge of claim 1, wherein said portion of the wastegate housing further defines a turbine nozzle.

4. The turbocharger cartridge of claim 3, wherein said portion of the wastegate housing further defines vanes for the turbine nozzle.

5. A wastegate for a turbocharger, comprising:
a main housing defining a passage therethrough;
a housing insert comprising a generally tubular member that is disposed in the passage of the main housing such that an interior of the housing insert defines a central flow passage, an annular space between an outer surface of the housing insert and an inner surface of the main housing defining an annular flow passage that surrounds the central flow passage; and
a valve seat and a valve member arranged in the annular space between the main housing and the housing insert;
wherein the main housing includes a portion that is generally tubular and extends upstream beyond the housing insert, said portion defining an aperture extending substantially 360 degrees about said portion and extending from a radially outer surface to a radially inner surface of said portion, and wherein a plurality of circumferentially spaced vanes extend across said aperture, said aperture and vanes comprising a turbine nozzle for the turbocharger.

6. The wastegate of claim 5, wherein said portion further defines a turbine contour.

7. The wastegate of claim 5, wherein the main housing includes one or more flanges configured to be affixed to a portion of an engine cylinder head.

8. The wastegate of claim 5, wherein the wastegate comprises a rotary valve, the valve member being in abutting engagement with the valve seat, each of the valve seat and the valve member having a plurality of circumferentially spaced orifices, the valve member being rotatable about an axis to vary an alignment between the orifices of the valve member and the orifices of the valve seat, from no alignment to maximum alignment, in order to vary a degree of openness of the rotary valve.

9. A turbocharger cartridge and engine cylinder head assembly, comprising:
a turbocharger cartridge forming a unit that comprises:
a center housing rotating assembly comprising a center housing defining a bore therethrough, bearings housed in the bore, a shaft rotatably supported in the bearings, a compressor wheel affixed to one end of the shaft, and a turbine wheel affixed to an opposite end of the shaft;
a housing member that defines a turbine nozzle and a turbine contour; and
a wastegate unit operable for allowing exhaust gas to bypass the turbine wheel when the wastegate unit is open; and
an engine cylinder head defining a receptacle for receiving the turbocharger cartridge, the engine cylinder head defining a diffuser for receiving and diffusing pressurized air from the compressor wheel, a compressor volute that receives the air from the diffuser, and a turbine volute for receiving exhaust gas from an engine;
wherein the turbocharger cartridge and the receptacle in the engine cylinder head are configured so that the cartridge slides, compressor wheel first, into the receptacle in an axial direction until the compressor wheel is aligned with the diffuser and the turbine wheel is aligned with the turbine nozzle.

10. The turbocharger cartridge and engine cylinder head assembly of claim 9, further comprising seals between the cartridge and the engine cylinder head, the seals being compressed to seal interfaces between the turbocharger cartridge and the engine cylinder head.

11. The turbocharger cartridge and engine cylinder head assembly of claim 9, wherein the wastegate unit comprises a rotating bypass valve.

12. The turbocharger cartridge and engine cylinder head assembly of claim 9, wherein the wastegate unit comprises a wastegate housing, and wherein the wastegate housing and the housing member that defines the turbine nozzle and turbine contour are portions of a one-piece integral structure.

13. The turbocharger cartridge and engine cylinder head assembly of claim 12, wherein said one-piece integral structure defines an array of vanes extending across the turbine nozzle.

14. The turbocharger cartridge and engine cylinder head assembly of claim 12, wherein said one-piece integral structure includes a portion defining a bore that receives an end of the center housing.

15. The turbocharger cartridge and engine cylinder head assembly of claim 14, further comprising a separate heat shield captured between the end of the center housing and said portion defining said bore.

16. The turbocharger cartridge and engine cylinder head assembly of claim 9, further comprising a compressor contour plug defining a compressor inlet and compressor contour.

17. The turbocharger cartridge and engine cylinder head assembly of claim 16, wherein the compressor contour plug is a separately formed part from the engine cylinder head.

\* \* \* \* \*